United States Patent
Kibble et al.

(10) Patent No.: US 6,224,821 B1
(45) Date of Patent: May 1, 2001

(54) QUICK CHANGE BLOW LANCE

(75) Inventors: Brian James Kibble, Cleveland; Ian Mervyn Craig, Stockton-on-Tees, both of (GB)

(73) Assignee: VAI Industries (UK) Limited, Stockton-on-Tees (GB)

( * ) Notice: Subject to any disclaimer, the term of this patent is extended or adjusted under 35 U.S.C. 154(b) by 0 days.

(21) Appl. No.: 09/442,578

(22) Filed: Nov. 18, 1999

(30) Foreign Application Priority Data

Nov. 19, 1998 (GB) .................................................. 9825428

(51) Int. Cl.[7] ...................................................... C21C 5/32
(52) U.S. Cl. .............................................................. 266/225
(58) Field of Search ..................................... 266/225, 226, 266/217, 287

(56) References Cited

U.S. PATENT DOCUMENTS 4,732,370 * 3/1988 Berry et al. .......................... 266/225

FOREIGN PATENT DOCUMENTS

0545142 A1 * 11/1992 (EP) .
1002880 A1 * 5/2000 (EP) .
2321952 * 8/1998 (GB) .
WO 97/17474 * 5/1997 (WO) .

* cited by examiner

Primary Examiner—Scott Kastler
(74) Attorney, Agent, or Firm—Fay, Sharpe, Fagan, Minnich & McKee, LLP

(57) ABSTRACT

There is disclosed a quick change plug and socket blow lance for use in steel conversion. To expedite exchange of an exhausted lance body (2) the lance body (2) has a plug (4) formed at an upper end adapted for reception in a socket (3) formed in a head (1). The socket and head are provided with various sealing surfaces whereby coolant water and oxygen for the conversion process can reliably be delivered to passages in the lance body (2). A locking mechanism is provided whereby the plug (4) can quickly be secured into the head socket (3) and separated after use. The locking mechanism consists of a plurality of circumferentially spaced projections (7) formed on a rotatable head ring (5) mounted at the mount of the socket (3). A lance body ring is secured to the lance body immediately below the plug (4) and provides a plurality of circumferentially spaced flange segments (8a) separated by gaps (8) through which the projections can pass as the plug (4) is inserted axially into the socket (3). When located the head ring (5) is rotatable to engage the projections with the flange segments and so on prevent separation of the plug from the socket during use.

20 Claims, 5 Drawing Sheets

QUICK CHANGE BLOW LANCE

The present invention is concerned with a blow lance of the type used to convert molten iron to steel by blowing oxygen into a converter vessel. In particular the present invention concerns the provision of a locking mechanism for use with the quick change lance described in detail in the applicant's co-pending patent publications GB9802609.9 (GB-A-2321952) and PCT/GB98/00376.

In order to expedite the replacement of a lance exhausted by use during steel conversion the aforementioned patent publications disclose a blow lance consisting of a head and a lance body. The heads is in the form of a socket, the upper end of the lance body is in the form of a plug to be plugged into the socket.

The lance body consists of an oxygen pipe surrounded by a water cooling jacket and weighs about five tones operating with the water jacket filled and about three tones dry. It is essential that no water enters the steel conversion vessel or a large explosion could occur. Consequently the cooling jacket consists of a delivery passage adjacent the oxygen pipe and a return passage to return coolant water from the tip of the lance to the head. More than one oxygen blow pipe may be required. The plug portion on the lance body includes sealing surfaces which cooperate with sealing surfaces in the socket so that oxygen ports and coolant delivery and recovery ports in the head communicate with the oxygen pipe and the cooling jacket. The isolation of the coolant and oxygen passages in the blow lance disclosed in GB-A-2321952, relies on O-ring seals and the metal sealing surfaces of the head socket and lance plug are not in direct contact.

During operation oxygen and coolant are delivered to the lance body through the head under great pressure. The pressures act on the horizontal surface of the lance creating forces acting along the vertical axis which tend to separate the lance body from the head. These forces combined with the deed weight of the lance body and any vibration in operation must be locked by a locking mechanism between the head and the lance body.

Known prior art blow lances include that disclosed in PCT/EP96/04693 (WO 9717474) of Thyssen where the blow lance is locked in place by means of hooks 51 which swing into position to engage trunnion pins 52 which project from a collar 53 fastened encircling the lance body 1.

The present invention aims to provide a reliable and durable locking mechanism for the blow lance disclosed in GB-A-2321952.

According to the present invention there is provided a quick change blow lance comprising:
a head and lance body,
a socket formed in the head,
a plug part formed on the top of the lance body,
whereby axial insertion of the plug part in the socket effects sealed communication of oxygen and coolant passages in the head and the lance body,
a locking mechanism to lock the plug in the socket and to release the plug from the socket when required, said locking mechanism having,
a projection extending from a mouth of the socket towards the axis and mounted for rotation about the axis between a loose position and a locking position and,
a flange extending radially from the lance body beneath the plug arranged so that the flange can pass the projection, in the loose position, during insertion of the plug in the socket and such that rotation of the projection to the locking position causes the flange to engage the projection to prevent separation of the plug and socket.

In use the head is supported on a gantry with the mouth of the socket pointing down. The projection is preferably one of several each separated from the adjacent projection by a circumferentially extending space and supported by a head ring rotatably mounted at the mouth of the socket. The head ring is preferably biased to rotate to the locking position by spring means, for example a coil spring, air spring or other resilient means. The flange will preferably be one of several each circumferentially spaced from the adjacent flange by a gap through which a projection may pass vertically.

Preferably stops are provided to prevent excess rotation of the head ring beyond either the locking position or the loose position.

In a preferred form of the invention the ring is also urged towards the locking position by an extensible ram. The ram is preferably hydraulic and may draw pressure from the coolant water supply via an hydraulic circuit. Alternatively a totally separate pressure source may be used such as pneumatic pressure from air or nitrogen.

A quick change blow lance constructed in accordance with the present invention will now be described, by way of example only, with reference to the accompanying drawings, in which:

Figure 1:
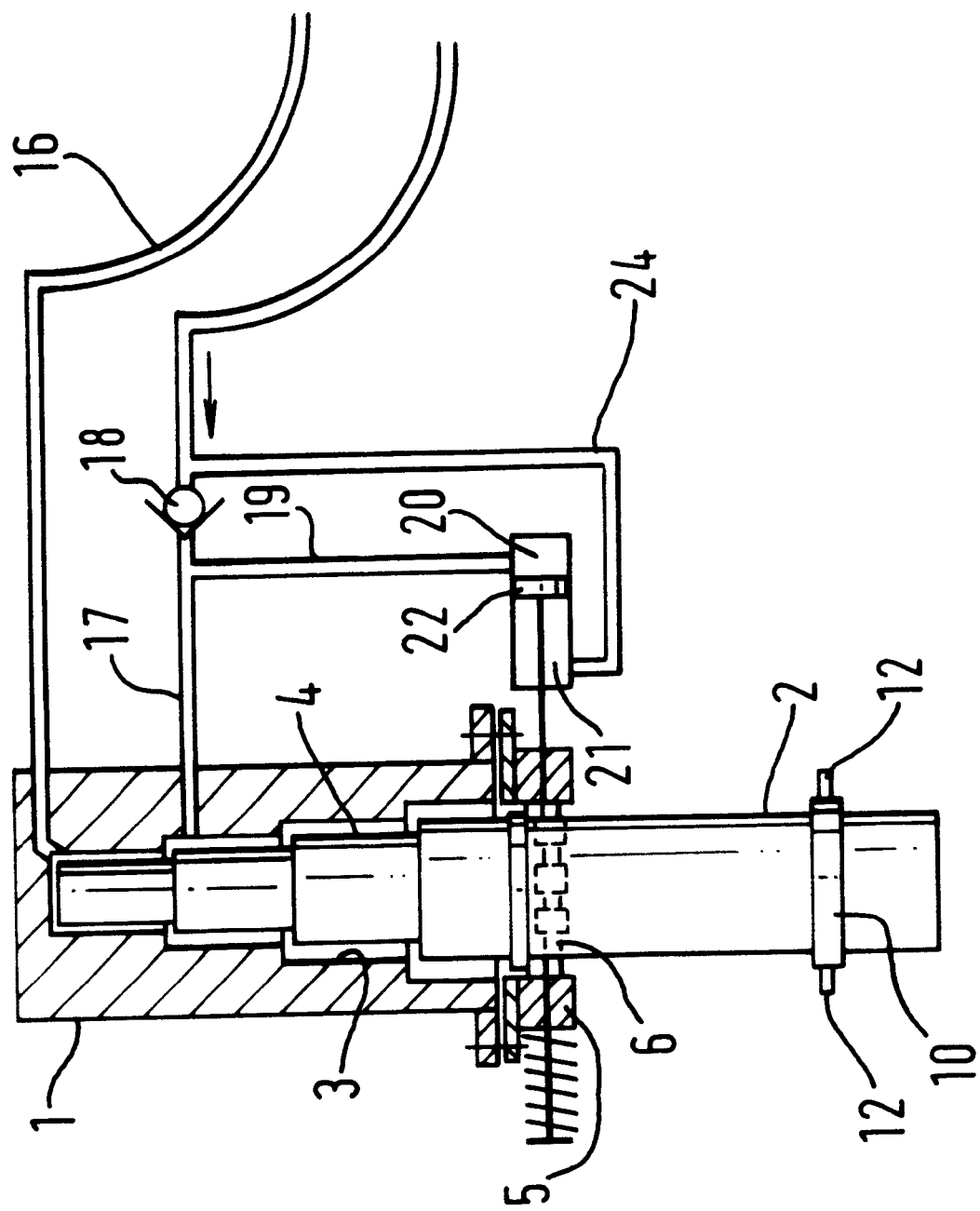
FIG. 1 is a diagrammatic sectional elevation of the blow lance plug and socket in the loose condition.

The quick change blow lance will be described assembled and upright as for use.

The lance assembly consists of a lance head 1 and a lance body 2. The lance head and body are provided with the quick coupling assembly described in the patent application PCT/GB98/00376 and GB9802609.9. This kind of quick coupling assembly tolerates substantial longitudinal and radial misalignment of the lance head and lance body during assembly. A socket 3 is formed in the head 1 to receive a plug 4 formed on top of the lance 2.

Figure 2:
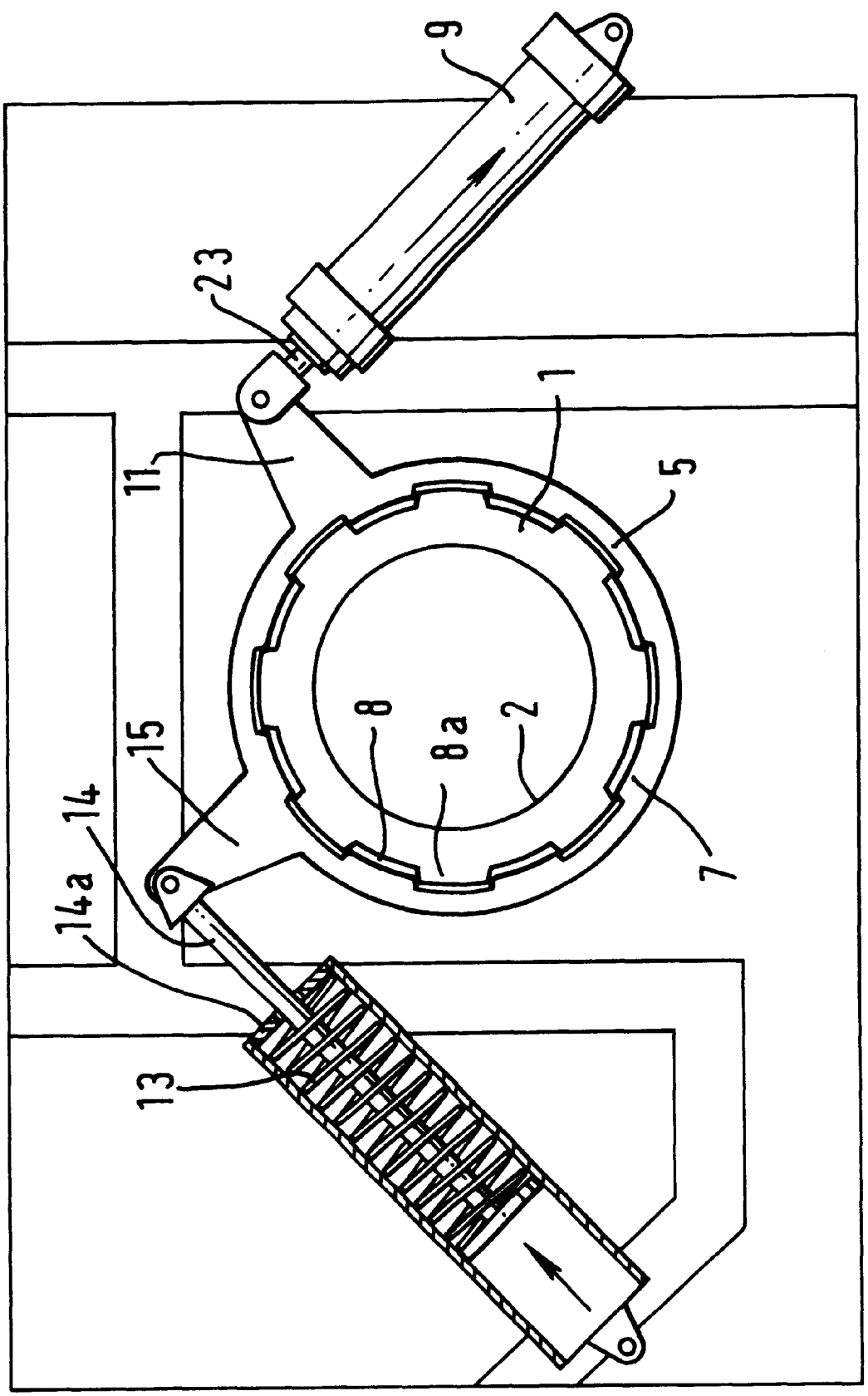
FIG. 2 is a sectional plan view of the mouth of the socket in the loose condition of FIG. 1.

A head ring 5 is secured to the head 1 at the mouth of the socket 3. The head ring 5 has a plurality of circumferentially spaced projections 7 which project radially towards the axis of the head 1 and a longitudinal axis of the lance 2. The head ring 5 is mounted for rotation about the vertical axis of the head 1. An hydraulic ram 9 is coupled to the head ring 5 by means of a radial arm 11. A helical spring 13 is coupled to the head ring 5 by means of a connecting rod 14 and a radial arm 15. When the head ring 5 is rotated to the release position shown in FIG. 2, the spring 13 is compressed against a fixed position 14a at the end near the arm 15 to bias the rotation of the arm 15 and head ring 5 in the anticlockwise direction as seen in FIG. 2.

Figure 3:
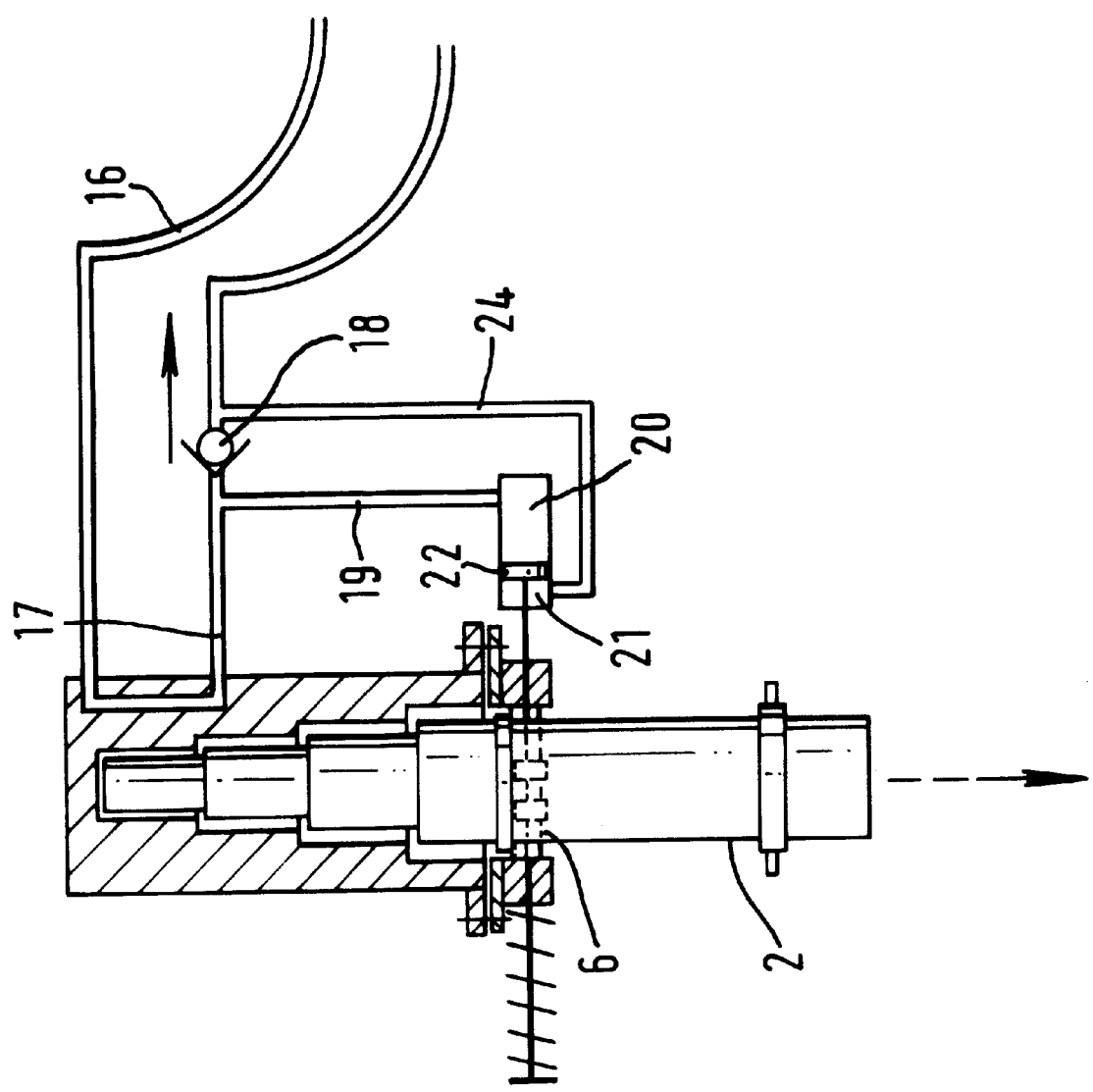
FIG. 3 is a sectional elevation of the plug and socket in the locking position.
Figure 4:
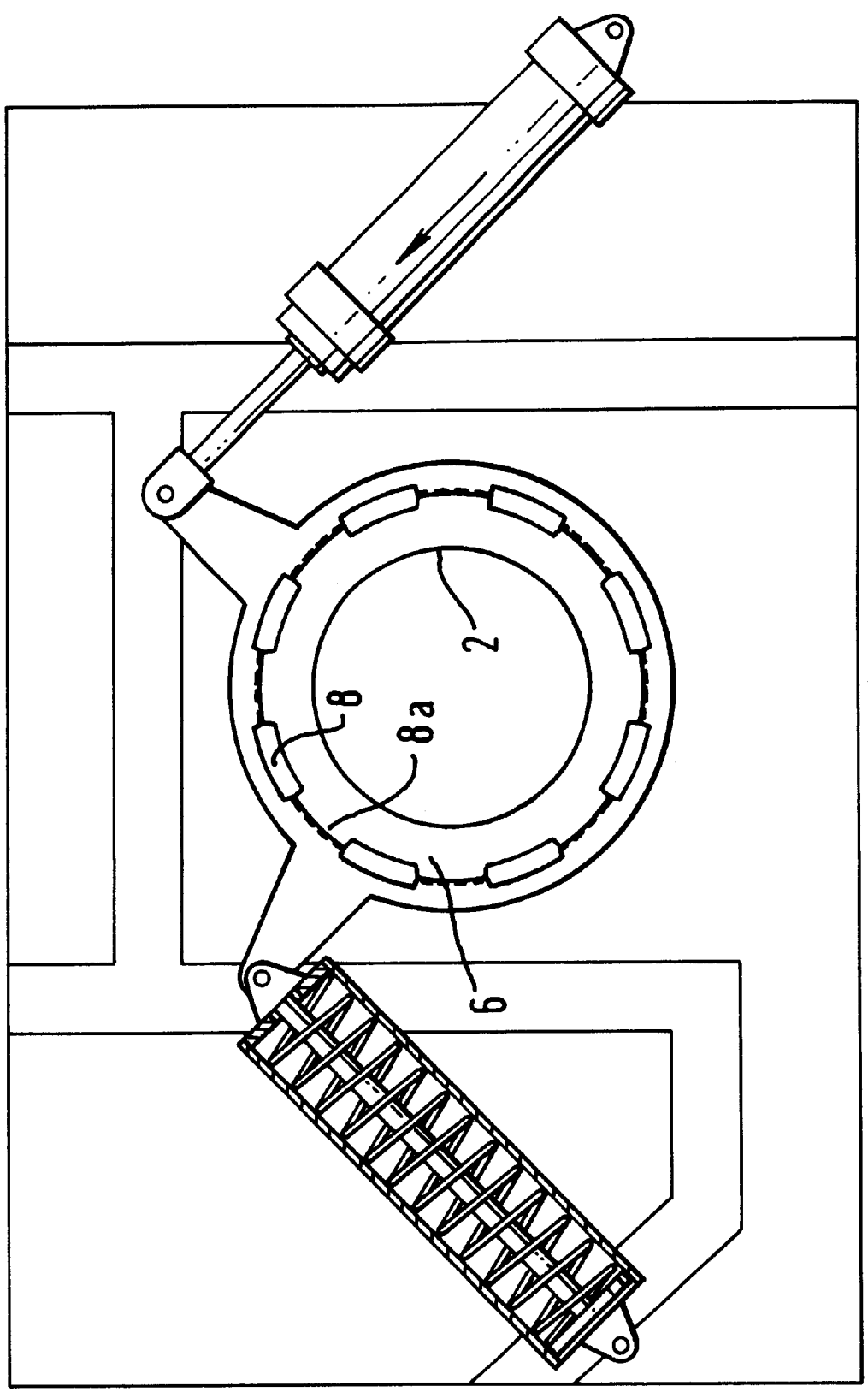
FIG. 4 is a sectional plan view of the mouth of the socket in the retention position of FIG. 3.

A lance body ring 6 is secured around the lance body 2 below the plug 4. The lance body ring 6 provides a flange in which are formed a plurality of circumferentially spaced gaps 8 separated by flange segments 8a. A trunnion ring 10 is secured to the lance body some distance below the plug 4 but above its center of gravity. A pair of trunnion pins 12 project diametrically away from the trunnion ring 10. FIGS. 1 and 3 show the hydraulic circuit for the hydraulic ram 9. The hydraulic circuit consists principally of the coolant water supply to the lance body cooling jacket described in detail in the aforementioned patent applications. Coolant water is delivered by a coolant delivery pipe 16 to pass into the head 1, through the lance body cooling jacket (not shown) and out of the head via a return pipe 17. A non-return valve 18 is located in the return pipe 17. Upstream of the non-return valve a junction connects a pipe 19 to a full bore chamber 20 of the double acting hydraulic ram 9. The full bore chamber 20 is separated from an annular chamber 21 by a piston 22 which is supported by a piston rod 23 projecting through the annulus chamber 21. A pipe 24 communicates the annulus chamber 21 with the return pipe 17 downstream of the non-return valve 18.

Initially, as shown in FIG. 1, no coolant water is delivered along the delivery pipe 16. In consequence there is no pressure in the full bore chamber 20 but pressure remains in the annulus chamber 21. The piston 22 is therefore driven into the full bore chamber and the head ring 5 is rotated clockwise to a loosed condition against the bias of the compression spring 13 as shown in FIGS. 1 & 2.

In order to connect and lock a lance body into the head ready for use, the lance body is first supported on trunnion pins 12 by means of the mechanism described in GB-A-2321952. The plug 1 is then inserted into the socket 3. As the plug 4 is inserted into the socket 3 the gaps 8 of the lance body ring 6 allow the passage of the projections 6 on the head ring 5. The rotational alignment of the projections 6 and gaps 8 is assured because the lance body exchange apparatus disclosed in GB A 2321952 fixes the rotational alignment of the head and lance body.

Pressure in return pipe 17, held against check valve 18 is now relieved which removes the holding force in annulus chamber 21. This allows spring 13 to rotate the head ring 5 anti-clockwise while extending the piston rod 23 and moving piston 22 into the annulus chamber 21. This is the locking position.

The coolant water supply is now turned on. When the water returns down the return pipe 17 pressure is delivered to the full bore chamber 20. Because the area of the piston exposed to pressure in full bore chamber 20 is greater than the area of piston in annulus chamber 21, the ram will remain extended with a resilient force proportional to the pressure difference. This reinforces the force from the compression spring 13 in the locked position. The blow lance is now ready for use.

To separate the exhausted lance body 2 from the head 1, after removing the blow lance from the immediate vicinity of the converter vessel, the coolant supply is switched off. The return pipe drains back to check valve 18 as does the full bore chamber 20. However, the check valve 18 prevents the chamber 21 from discharging. Consequently the pressure in the annulus chamber 21 causes the piston 22 to retract, simultaneously rotating the head ring 5 clockwise against the bias of the spring 13. The projections 6 are thus aligned with gaps 8 so that they can pass through the gaps to loose the lance body 2. The lance body is thus held only by the lance body exchange apparatus.

Utilizing the cooling water pressure to power the retention mechanism in the manner described allows control of the operation from a valve stationed remote from the lance head trolley, this means no extra fluid hoses or solenoid valves are required at the lance head trolley.

Figure 5:
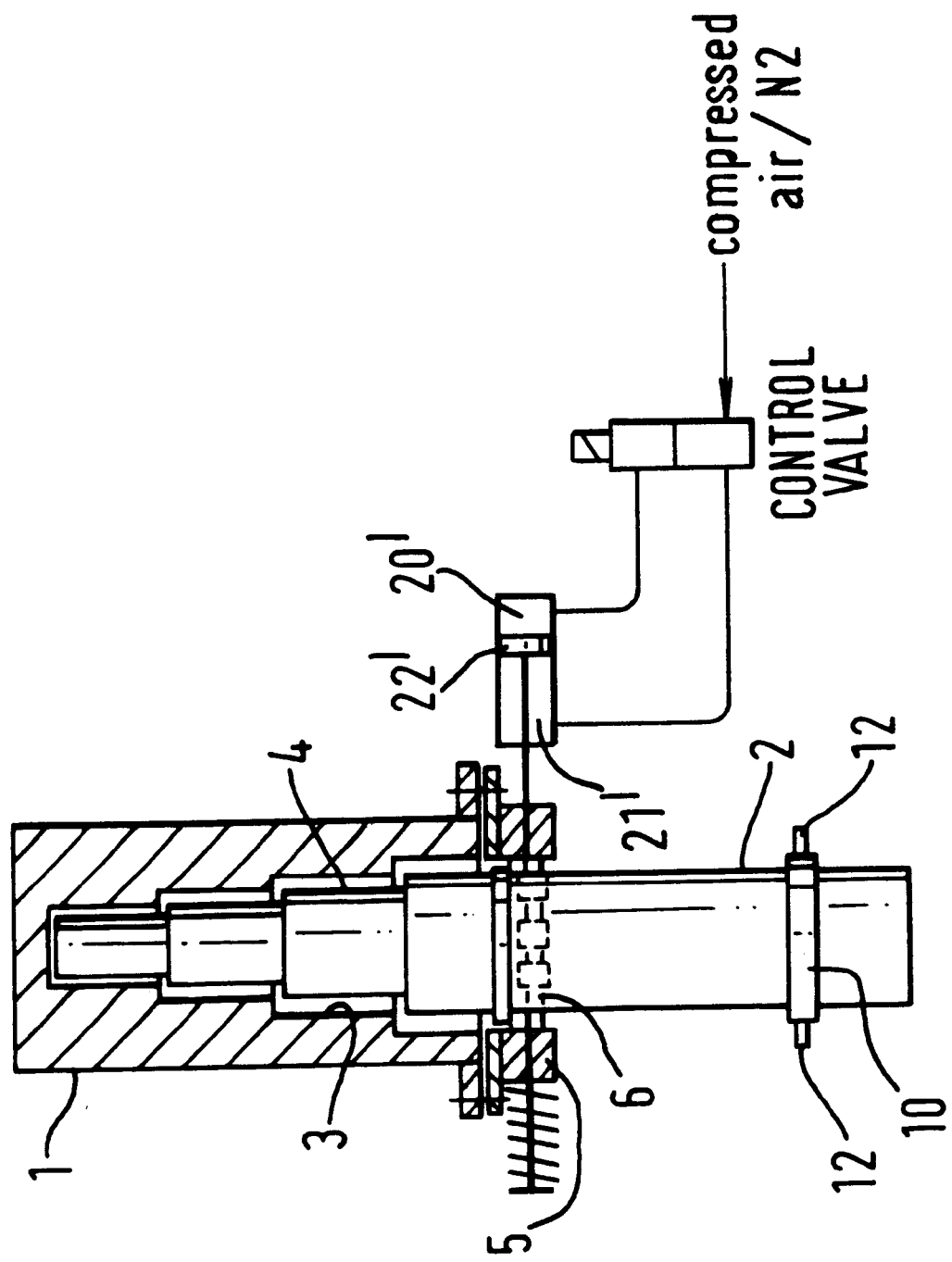
FIG. 5 is a diagrammatic view of an embodiment having a pneumatically driven locking system.

FIG. 5 illustrates an alternative embodiment of the invention in which the hydraulic ram is replaced by a pneumatic ram having a full bore chamber 20' and an annulus chamber 21' which can displace a piston 22'. Pneumatic fluid, which will usually be air or nitrogen, is delivered to either the full bore chamber 20' or the annulus chamber 21'. With pressure delivered to the full bore chamber 20' the pressure force on the piston assists the bias on the spring 13 and displaces the head ring 5 to the locked position. With pressure on the annulus chamber and discharged from the full bore chamber the bias of the spring 13 is overcome to displace the head ring 5 to the unlocked condition.

What is claimed is:

1. A quick change blow lance comprising:
   a head
   a lance body having a longitudinal axis,
   a socket formed in the head,
   a plug part formed on the top of the lance body, whereby axial insertion of the plug part in the socket effects sealed communication of oxygen and coolant passages in the head and the lance body,
   a locking mechanism to lock the plug part in the socket and to release the plug part from the socket when required, said locking mechanism having,
      a projection extending from a mouth of the socket towards the longitudinal axis of the lance and mounted for rotation about the axis between a loose position and a locking position and,
      a flange extending radially from the lance body beneath the plug part arranged so that the flange can pass the projection, in the loose position, during insertion of the plug part in the socket and such that rotation of the projection to the locking position causes the flange to engage the projection to prevent separation of the plug part and socket.

2. A quick change blow lance according to claim 1 which has a head adapted for support on a gantry with a mouth of the socket facing down.

3. A quick change blow lance according to claim 1 wherein there are a plurality of projections, each separated from an adjacent projection by a circumferentially extending space.

4. A quick change blow lance according to claim 1 wherein the projection is supported by a head ring rotatably mounted at the mouth of the socket.

5. A quick change blow lance according to claim 4 wherein the a biasing device is provided to urge the head ring to rotate toward the locking position.

6. A quick change blow lance according to claim 5 wherein the biasing device is provided by a spring.

7. A quick change blow lance according to claim 6 wherein the spring is a coil spring.

8. A quick change blow lance according to claim 6 wherein the spring is an air spring.

9. A quick change blow lance according to claim 1 provided with a plurality of flanges each circumferentially spaced from the adjacent flange by a gap through which a projection may pass.

10. A quick change blow lance according to claim 1 wherein a stop is provided to prevent excess rotation of the head ring beyond either the locking position or the loose position.

11. A quick change blow lance according to claim 4 wherein an extensible ram is provided to urge the head ring toward the locking position.

12. A quick change blow lance according to claim 11 wherein the ram is hydraulic.

13. A quick change blow lance according to claim 12 wherein an hydraulic circuit is provided to deliver hydraulic pressure from the coolant water to actuate the ram.

14. A quick change blow lance according to claim 12 wherein a pneumatic pressure source is provided to deliver actuating pressure to the ram.

15. A quick change blow lance comprising:

a head including a socket;

a lance body including a plug part;

a projection rotatably secured to the head; and a flange rigidly secured to the lance body, wherein in a first rotational position of the projection, the flange allows the projection to pass, as the plug part is inserted into the socket, and in a second rotational position the flange engages the projection to prevent a removal of the plug part from the socket.

16. A quick change blow lance comprising:

a head including a socket;

a lance body including a plug part;

a first protrusion secured to one of the head and the lance body; and a second protrusion secured to the other of the head and the lance body, wherein one of the first and second protrusions is rotatably mounted and the other of the first and second protrusions is rigidly mounted, such that a rotation of the rotatably mounted protrusion to a first position allows the first and second protrusions to move axially in relation to each other and enables the plug part to enter the socket and a rotation of the rotatably mounted protrusion to a second position causes the first and second protrusions to cooperatively engage so as to prevent separation of the plug part and the socket.

17. The quick change blow lance of claim 16, wherein the first protrusion extends from a ring rotatably mounted on the head and the second protrusion extends from a ring secured around the lance body.

18. The quick change blow lance of claim 16, wherein a series of first protrusions is spaced about an inner circumference of a ring rotatably mounted on the head; and a series of second protrusions is spaced about an outer circumference of a ring secured to the lance body so as to provide a gap between each two second protrusions corresponding to each first protrusion in a first rotational position of the ring.

19. The quick change blow lance of claim 16, wherein the rotatable mount for one of the first and second protrusions includes a piston, whereby the first and second protrusions are selectively engaged and disengaged through movement of the piston.

20. The quick change blow lance of claim 16, wherein the rotatable mount for one of the first and second protrusions includes a compression spring, whereby the rotatable mount is biased into one rotational end position by the compression spring.

* * * * *